ARRANGEMENT FOR EFFECTING CONDITIONAL SWITCHING OPERATIONS

Filed June 15, 1962

3 Sheets-Sheet 1

Dec. 15, 1964 M. WILLIAMS 3,161,862

ARRANGEMENT FOR EFFECTING CONDITIONAL SWITCHING OPERATIONS

Filed June 15, 1962 3 Sheets-Sheet 2

Dec. 15, 1964 M. WILLIAMS 3,161,862

ARRANGEMENT FOR EFFECTING CONDITIONAL SWITCHING OPERATIONS

Filed June 15, 1962 3 Sheets-Sheet 3

United States Patent Office 3,161,862 Patented Dec. 15, 1964

3,161,862

ARRANGEMENT FOR EFFECTING CONDITIONAL SWITCHING OPERATIONS

Michael Williams, Watford, England, assignor to The General Electric Company Limited, London, England Filed June 15, 1962, Ser. No. 202,916
Claims priority, application Great Britain, June 16, 1961, 21,888/61
8 Claims. (Cl. 340—174)

The invention relates to an arrangement employing magnetic thin film and designed for effecting switching operations conditional on the state of magnetisation of one or more thin film elements of the arrangement.

When a magnetic thin film is deposited on a highly polished surface in a magnetic field the film can be caused to have an axis of easy magnetisation along which the magnetisation of the film is aligned in the absence of an external magnetic field. An area of such a film therefore has two stable states of magnetisation corresponding to the two directions along this easy axis in which the film magnetisation can lie, and areas of such film have been proposed for use as bi-stable storage elements in data processing devices, for example, computer data stores.

An area of magnetic thin film may be used to store a binary digit, which digit may represent, for example, information to be processed in a computer, or instructions to the computer for controlling its operation. The two stable states constituted by the two directions of magnetisation along the easy axis are used to represent the digits "0" and "1," and the switching of the storage areas of magnetic thin film into one or the other of these states to represent the appropriate digit is referred to as "writing in" information. The determination of the direction of magnetisation and hence of the digit held in any storage area is referred to as "reading" the information. A pick-up conductor is generally required coupled with storage area for the purpose of reading the information stored in that area and means must also be provided for generating the necessary magnetic field at each storage area to write into that area any information which is required to be stored there. Usually two sets of conductors overlying the magnetic thin film will be employed for writing information in this way, one conductor of each set being energised to switch the storage area lying under their region of overlap. The storage areas may each consist of a separate discrete area of magnetic thin film, or the sheet of film may be continuous over the surface on which it is deposited, the storage areas being defined by the overlying conductors, and the intervening areas of the magnetic thin film being ineffective for storage purposes.

The conductors of one or both sets may be double, so that there will be two, four, or some greater even number of storage areas associated with each conductor pair and cooperating to form a storage element for the storage of a single binary digit.

According to the present invention an arrangement for effecting conditional switching operations comprises a conducting sheet carrying magnetic thin film having an easy axis of magnetisation and providing at least one group of storage elements which group includes at least one input storage element and one output storage element closely coupled electromagnetically by a closed conducting loop overlying the storage areas of all the elements of the group and crossing the storage areas perpendicular to the easy axis of the film, means for writing information into at least one input storage element and means for modifying the magnetisation of the storage areas so that by virtue of the electromagnetic coupling due to the closed coupling loop the output storage element may be switched to a state of magnetisation depending on the state of magnetisation of the other storage elements of the group.

The simplest form of arrangement according to the invention has a single input storage element into which information may be written and from which it may be transferred to the output storage element by operation of the modifying means. Such a device provides a means of conditionally transferring information from one storage element to another, such as is required, for example, in shift registers. However, arrangements according to the invention may usefully be provided having a larger number of input storage elements, and in particular an arrangement with three input storage elements may, as is shown below, be used for performing the logical AND and OR operations. Where an arrangement has more than one input storage element, preferably writing means is provided for writing information into each of the input storage elements, and such means will in general be essential if the arrangement is to be used for repeated operation.

In a preferred construction of an arrangement according to the invention the coupling loop comprises a pair of closely-spaced straight parallel conductors overlying the film-carrying surface perpendicular to the easy axis of the film and joined at each end to form a closed loop, and the means for writing information into the input storage elements and for modifying the magnetisation of the storage areas comprises a first drive conductor of hairpin form having parallel straight limbs overlying the straight portions of the coupling loop over the input storage areas, and a set of second drive conductors parallel to the easy axis of the film and crossing the coupling loop and the storage areas of the input and the output storage elements. The coupling loop must be closely adjacent to the magnetic thin film, but the order of the first and second drive conductors is a matter of choice. A pick-up conductor in general will also be required for reading out information transferred to the output storage element and this may take the form of a hairpin-shaped conductor having parallel straight portions overlying the straight portions of the coupling loop where it crosses the storage areas of the output storage element. Each storage element will consist in this case of 2, 4, or more separate storage areas according to whether the drive conductors of the second set are single, double or multiple. The magnetic thin film can be applied by evaporation on to a highly polished sheet of aluminum, and may consist of nickel-iron or nickel-iron-cobalt alloy. The film may conveniently be continuous over the surface of the aluminum, the storage areas being defined by the crossings of the overlying drive conductors and coupling loops.

A number of groups of storage elements arranged according to the invention may in some cases be formed side by side on the same conducting sheet.

The spacing between the coupling loop and the magnetic thin film should be as small as possible in order to obtain sufficiently close coupling, and preferably the coupling loop is formed of aluminum anodised on the surface to insulate it from the film and applied with the anodised surface in contact with the film.

The invention includes within its scope an arrangement as described above in combination with the necessary pulse generators to generate the pulses for writing information into the input storage elements, and for modifying the magnetisation of the storage areas of the elements to switch the output storage element conditionally upon the state of the input storage elements, and reading means responsive to the condition of the output storage element.

The operation of the device depends on the difference in behaviour of the coupling loop at different rates of rise and fall of current pulses in the drive conductors.

When a current pulse is applied to a drive conductor parallel to the easy axis it generates a field which rotates the direction of magnetisation of its underlying storage areas out of the easy axis and thereby induces a current flowing round the coupling loop. If this rotation occurs rapidly, an exponentially decaying current continues to flow round the coupling loop for a short while after the rotation ceases, the time constant of this decay being determined by the self-inductance and resistance of the coupling loop. The effect of this current in the coupling loop is to tend to oppose any change in the total magnetic flux linked with the loop. A drive current pulse which would rotate the easy axis of a storage area in a very short time would therefore, through the action of the loop, produce a field which would tend to affect the other storage areas linked with it. On the other hand, if the rotation of the direction of magnetistation of a storage area out of the easy axis is accomplished in a time which is long compared with the time constant of the loop, the currents induced in the loop are dissipated in its own resistance, and the coupling between the storage areas linked by the loop is negligible. It is therefore possible to write information into input storage elements whose storage areas are coupled by the loop to other storage areas without transferring the information by using pulses for writing which are long compared with the loop time constant, and then to transfer the information so written by using pulses having rise or fall times which are rapid compared with the loop time constant, and which are suitably synchronised with pulses which set the output storage elements into a responsive condition. A further reading pulse which is long compared with the loop time constant may be used for reading out the information so transferred.

The foregoing explanation implicitly assumes that the coupling loop is closely coupled both with the input and with the output storage elements. This would normally mean that the coupling loop would have to be closely wrapped round the ferromagnetic material constituting these elements, an arrangement which in the case of a magnetic thin film would be highly inconvenient to construct in practice, and would involve making connections to or through the base on which the film is supported.

An essential feature of the present invention by means of which this difficulty is overcome consists in the use of a film carried on a conducting surface and having a closed conducting loop overlying the storage areas which it links.

This arrangement depends for its effectiveness on eddy currents within the conducting sheet on which the film is deposited. When the directions of magnetisation of the storage areas of the magnetic thin film are rotated, voltages are induced in the coupling loop which cause a current to flow round this loop. Eddy currents are then induced by the loop in the conducting sheet underlying the magnetic thin film, the magnetic effects of which may be taken, at points outside the surface of the sheet, as being equivalent to those which would be produced by a current equal and opposite to that flowing in the coupling loop, and occupying the position of the optical image of the loop if it were reflected in the conducting surface. The combined magnetic field of the coupling loop current and this image current is effective in the space between the coupling loop and the conducting surface which contains only the magnetic thin film and the thin insulating layer which separates the coupling loop from the film and its supporting sheet. A substantial flux due to the loop current is therefore available for switching the storage areas.

If it were not for the effect of the eddy currents in the underlying conducting sheet, the coupling loop would be completely ineffective, as the flux due to any current in the loop would merely thread the central aperture bounded by the loop, passing through air and the supporting sheet, and also through areas of magnetic thin film which play no active part in information storage and in a direction normal to the film so as to produce no switching effect.

The invention will be further described by way of example with reference to the accompanying drawings, in which.

Figure 1:
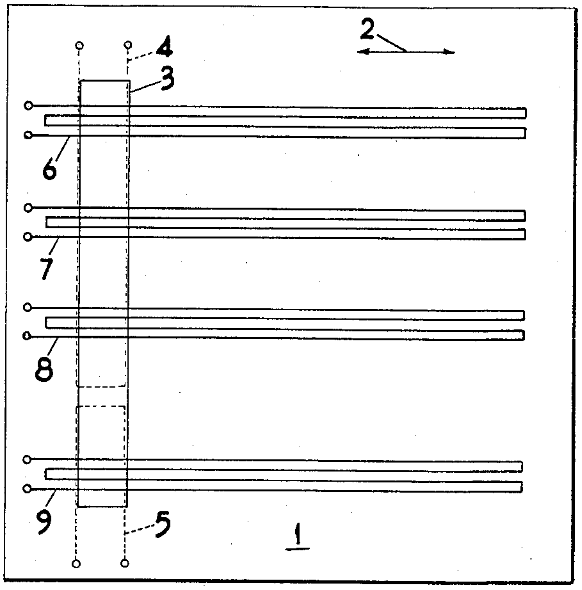
FIGURE 1 shows, in a schematic form, the essential features of a three-input arrangement according to the invention capable of being used as an AND or OR gate.
Figure 3:
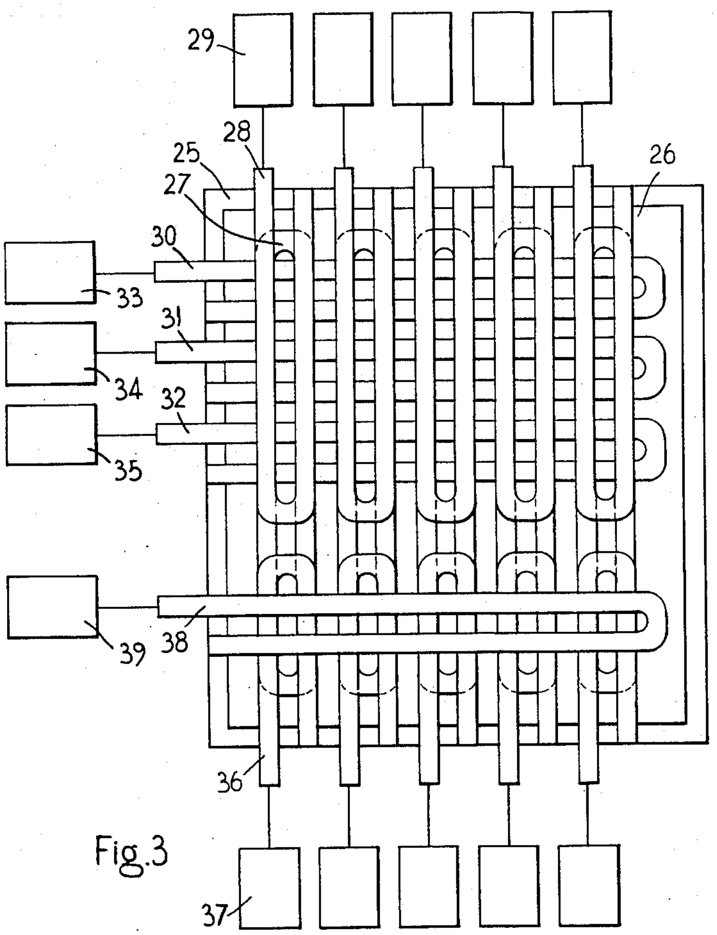
Figure 4:
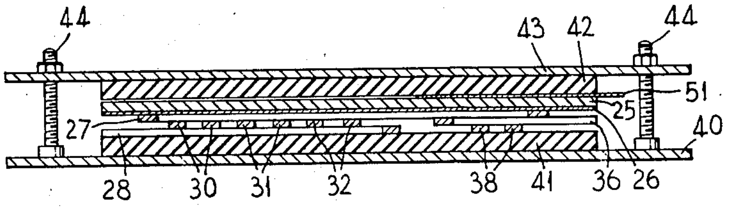
Figure 5:
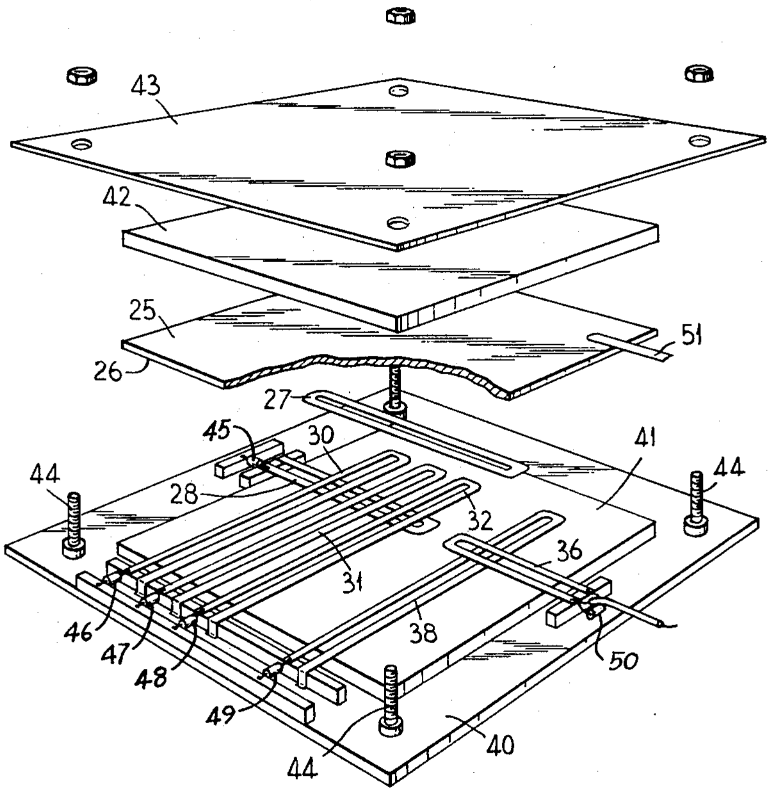

FIGURE 3 shows an arrangement of the same general kind as that shown schematically in FIGURE 1, in combination with the necessary pulse generators to generate pulses for writing information into its input storage elements and for modifying the magnetisation of the elements for information transfer and output reading, and FIGURES 4 and 5 shows schematically, respectively in sectional elevation and in fragmentary exploded perspective view, the dispositions of the components of an arrangement of the kind shown in FIGURE 3.

Referring first to FIGURE 1 of the drawings, the arrangement shown there consists of a highly-polished sheet of aluminium 1 carrying on its surface a thin film of ferromagnetic alloys of 80% nickel, 17% iron, 3% cobalt, deposited by vacuum evaporation in a magnetic field which aligns its easy axis in the direction indicated by the arrows 2.

To the surface of the magnetic thin film there is applied a conducting loop 3 of rectangular form, insulated from the thin film, but very close to it. The loop is formed from aluminum foil 0.001 inch thick mounted on a film of polyethylene terephthalate of similar thickness by means of a pressure-sensitive adhesive, anodised on its free surface, and applied with its anodised surface against the surface of the magnetic thin film carried by the aluminum plate 1.

Overlying the greater part of the length of the loop 3 are the two limbs of a hairpin-shaped conductor 4, which serves as a drive conductor for the input storage elements of the film, and whose limbs, together with the portions of the conducting loop 3 which they overlie, are perpendicular to the easy axis of the film. A similar conductor 5 overlies most of the remainder of the loop 3, and serves as a pick-up conductor for the output storage area. The limbs of this conductor also lie perpendicular to the easy axis of the film.

These conductors may be formed similarly of aluminum or copper foil mounted on a plastic film and placed in registration over the film carrying the coupling loop 3. In the drawings the conductors 4 and 5 are shown slightly displaced from the loop 3 for clarity.

Three further drive conductors, 6, 7, and 8, overlie the loop 3 and the drive conductor 4, each consisting of four parallel paths parallel to the easy axis of the film. The four paths are connected at their ends so that all four paths of each conductor are in series. A similar drive conductor 9 overlies the coupling loop 3 and the pick-up conductor 5, and is similarly formed.

These conductors may also be formed on a plastic film which is assembled on top of that carrying the conductors 4 and 5 with the parallel paths of the conductors parallel to the film easy axis. The plastic films and plates may be clamped under resilient pressure pads to maintain them in position, and if desired the conductors may be slotted, at least where they cross one another, in order to reduce eddy currents.

The storage areas are those areas of magnetic thin film which are crossed by a pair of drive conductors, one parallel and one perpendicular to the film easy axis. In the arrangement shown in FIGURE 1 in which the conductors 6, 7, 8, have each four parallel paths and the conductor 4 has two parallel paths, each storage element is constituted by the eight areas of film which underlie the crossings of the drive conductors 4 with each of the drive conductors 6, 7, and 8. Similarly the output storage element consists of the eight film areas which underlie the crossing of the drive conductor 9 with the pick-up conductor 5. In operation the areas of each storage element combine to reinforce one another and give an output signal when switched by the passage of current in the appropriate drive conductors.

It will be understood that the construction so far described is that of a single gating element, and that in practice a number of such elements would be mounted side by side upon a single film-bearing aluminum sheet 1, conducting loops 3 and conductors 4 and 5 being repeated along the length of the drive conductors 6, 7, 8, and 9 to form an assembly of gating arrangements.

The functioning of a single gating arrangement of the kind shown in FIGURE 1 will now be described with reference to FIGURE 2.

Figure 2:
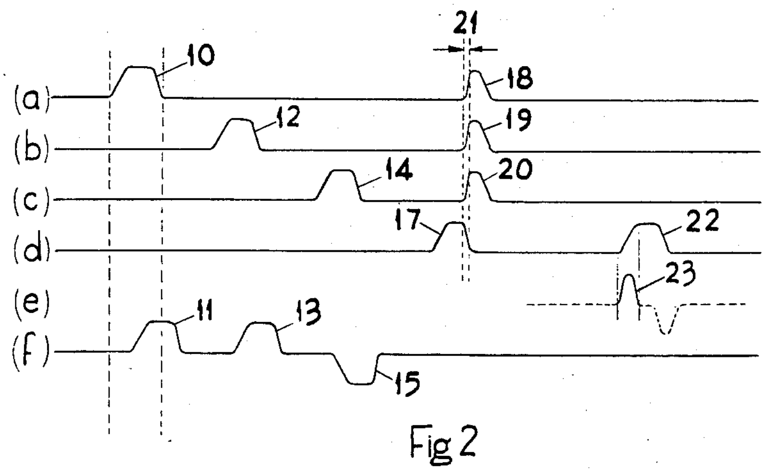
FIGURE 2 shows current and voltage waveforms illustrating the mode of operation of the arrangement of FIGURE 1.

In FIGURE 2 the waveforms (*a*), (*b*), (*c*), and (*d*), respectively represents currents flowing in the drive conductors 6, 7, 8, and 9. The waveform (*e*) represents a voltage induced in the pick-up conductor 5 in a reading operation, and (*f*) represents current flowing in the drive conductor 4.

To write information into the storage element constituted by the areas underlying the crossings of the conductors 4 and 6 a current pulse is applied to the conductor 6 which rotates the directions of magnetisation of the various film areas until they are perpendicular to the easy axis. A current pulse is then applied to the conductor 4, producing a component in one or the other sense along the easy axis, and this current is maintained while that in the conductor 6 ceases. When this happens the magnetisation of the film areas tends to fall back into one or the other sense along the easy axis determined by the polarity of the current in the drive conductor 4, and so represent a digit "0" or "1."

This process is illustrated in FIGURE 2, where the pulse 10 represents current flowing in the drive conductor 6 and the pulse 11 that flowing in the drive conductor 4. The pulses are staggered in time, so that the pulse 11 is maintained while the pulse 10 dies away so as to bias the magnetisation of the areas at is falls back into the easy axis in the required sense.

A similar pair of pulses, 12 and 13, now applied respectively to the drive conductors 7 and 4, and similarly staggered in time, will write a digit into the second input element.

Similarly a pair of pulses 14 and 15 on the drive conductors 8 and 4 respectively will write a digit into the third input storage element. In the scheme of pulses shown in FIGURE 2 the pulse 15 is opposite in polarity to the pulses 11 and 13, so that the digit written into the third input storage element is of the opposite kind to those written into the first two storage elements. The digits may be taken as being respectively 1, 1 and 0.

The conditional switching operation which will shortly be described results in the writing into the output storage element whose areas underlie the conductors 9 and 5 of a digit which is in accordance with the majority of the three digits written into the input storage elements. The arrangement may be regarded as an AND gate or an OR gate with respect to the contents of two of the storage input elements, the third input storage element containing a control signal determining the function of the arrangement, the control signal being a "1" in the case of an OR gate or a "0" in the case of an AND gate.

Considering this in more detail, if the control input storage element contains a "0" the output will be "1" if, and only if, both of the other two storage areas contain "1." In this case the arrangement is functioning as an AND gate: On the other hand, if the control input storage area contains a "1" the output will be "1" if either of the other two input storage areas contains "1," the arrangement therefore functioning as an OR gate. In the foregoing description the two digits written by the pulse pairs 10, 11 and 12, 13 may be taken as representing an input of "1" into two of the input storage elements, and the pulse pair 14, 15 may be taken as representing a control signal comprising the digit "0" and determining that the arrangement is to function as an AND gate.

In order to initiate the switching operation a current pulse 17 is supplied to the drive conductor 9. This has the effect of rotating the magnetisation of all the storage areas constituting the output storage element until they are at right-angles to the easy axis 2. As this pulse decays, pulses 18, 19, and 20, are applied respectively to the drive conductors 6, 7, and 8, rotating the magnetisations of the areas constituting the three input storage elements out of the easy axis as those of the areas of the output storage element fall back. The decay time of the pulse 17 and the rise times of the pulses 18, 19 and 20 are very short and are accurately synchronised within a narrow time interval 21 (exaggerated in FIGURE 2 for clarity).

The effect of the rotation of the magnetisations of the areas of the input storage elements is to induce a current in the coupling loop which acts as a drive current for the output storage elements and biasses the directions into which its individual storage areas fall back into the easy axis, so causing a signal of one or the other, polarity to be written into the output storage area in accordance with the majority of the settings of the three input storage elements.

The operation is completed by reading from the output storage element, at any later time when it is required, the digit which has been written in. This is done by applying to the drive conductor 9 a pulse 22 which rotates the magnetisations of the storage areas of the output storage elements out of the easy axis, and in doing so induces a voltage in the pick-up conductor 5 which is the sum of the voltages induced by each individual area. This voltage is gated, and the portion 23 which occurs during the rise time of the reading pulse 22 indicates by its polarity the digit contained in the output storage area.

If a "1" had been written into a third input storage area to constitute the control signal by reversing the polarity of the pulse 15, the arrangement would have functioned as an OR gate.

For the arrangement to operate successfully in the manner described above it is necessary that the pulses used for writing into the input storage elements should be long compared with the time constant of the coupling loop 3, and that the rise time of the pulses 18, 19, 20 and the fall time of the pulse 17, represented by the time interval 21, should be short compared with this time constant. The reason for this is that for relatively slow changes in the drive currents, and correspondingly slow rotations of the magnetisation of the storage areas, small currents are induced in the loop 3, and are dissipated in the resistance of this loop. These currents tend to hinder the rotation of the magnetisation of the film areas, and to ensure that the drive current pulses are fully effective for rotating the magnetisation of the areas it is necessary for them to be long enough to allow this induced current to die away substantially completely. On the other hand, in the switching operation which takes place during the decay of the pulse 17 and the rise of the pulses 18, 19, 20, the current in the coupling loop 3 is employed to ensure that the magnetisations of the areas of the output storage element fall back into the required directions, and this operation must therefore take place in a sufficiently short time to ensure that the current in this loop remains effective.

Two or more arrangements according to the invention may be connected in cascade, the output storage element of one serving as an input storage element of a second. To use the arrangement of FIGURE 1 in this way the pick-up conductor 5 consitutes one end of a further closed coupling loop similar to the loop 3 and closely overlying it where it crosses under the drive conductor 9, and so overlying the storage areas of the output storage element. Further drive conductors provide the output storage element of this arrangement and any further input storage elements that may be required. The output storage element of the second arrangement may be provided with a pick-up conductor or with a further coupling loop to enable it to form an input storage element of a further arrangement. If each arrangement of such a cascaded series has a single input storage element the series forms a shift register.

In the arangement shown in FIGURE 1 the drive conductors 6, 7, 8 and 9 are four-fold, and the drive conductor 4 and pick-up conductor 5 are two-fold, so that the output storage element and each of the input storage elements consists of eight storage areas. It is not necessary that this should be so, although it will usually be desirable for the number of storage areas in each element to be two or a multiple of two, so as to enable use to be made of both sides of the coupling loop. The number of paths of the drive conductors 6, 7, 8 and 9, and consequently the number of areas in each storage element, may be chosen with regard to the desired impedance of the drive conductors to their associated pulse generators and with regard also to the mechanical construction of the arrangement. It is, further, not essential that the number of areas in the input storage elements should be equal to that in the output storage element, or that their total areas should be equal. For example, by using a double conductor in place of the four-fold conductor 9, and of a similth width to the conductors 6, 7, and 8, switching may take place from eight-fold input storage areas into a four-fold output storage area, with an increased tolerance on pulse height and timing, but at the cost of a smaller output signal from the pick-up conductor 5.

FIGURE 3 shows an arrangement of the same general kind as that represented schematically in FIGURE 1, but using double drive conductors for all the storage areas, so that each input or output storage element comprises four storage areas in cooperation. The figure shows an assembly of five units, each comprising an arrangement generally similar to that described with reference to FIGURE 1, but with two-fold drive conductors, in conjunction with pulse generators and reading amplifiers for its operation in the manner already described.

The units are assembled on a polished plate of aluminium 25 coated with magnetic thin film 26. The plate 25 is of high purity aluminum with its surface finished to a high polish by a chemical polishing process, and on which there has been evaporated in a high vacuum a thin film of ferromagnetic alloy of the composition 80% nickel, 17% iron, 3% cobalt of a thickness of 1,600 angstrom units. During the evaporation process the plate was heated to a temperature of 320 degrees centigrade and maintained in a magnetic field of as high a uniformity as possible in order to orient the easy axis of the magnetic thin film parallel to one of the edges of the plate. The plate preferably should have its easy axis uniform to within a tolerance of plus or minus 2 degrees over the whole of its operative area.

A film-coated plate manufactured in this way and found to be suitable was found on measurement to have an anisotropy field of 2.4 oersteds and a coercivity of 1.6 oersteds.

The drive and pick-up conductors were next formed from high purity aluminum foil 0.001 inch thick. The conductors were all 1½ millimeters wide with a gap between the limbs of one millimeter, the coupling loop having an overall length of 4 centimeters, and the hairpin-shaped conductors having sufficient length to permit of connections being made to their ends.

After cutting from the aluminium foil sheet these conductors were all insulated by anodising. The anodising process was carried out in a 3% chromic acid solution at a temperature of 40 degrees C. using a carbon cathode, the voltage being increased to 40 volts in steps of 5 volts at a time over a period of 15 minutes. Anodising was then continued for a further 30 minutes at a voltage of 50 volts, the conducting strips subsequently being rinsed in hot distilled water and dried by washing with alcohol.

The arrangement shown in FIGURE 3 has five similar units each comprising a coupling loop 27 laid over the magnetic thin film with its length perpendicular to the film easy axis. Overlapping the greater part of the length of this lies a hairpin-shaped drive conductor 28 having provision at one end for connecting to a pulse generator 29 and earthed to the metal base supporting the plate 25 at the other.

Crossing over or between the conductors 27 and 28 at right angles, and therefore parallel to the easy axis are three further hairpin shaped drive conductors 30, 31, 32, each again terminated at one end with provision for connection to a pulse generator 33, 34, 35 respectively and earthed at the other to the metal base supporting the plate 25. The drive conductors 30, 31, 32 extend across all five of the units mounted on the plate 25 and where each of them crosses one of the coupling loops 27 it overlies four small square areas of magnetic thin film which cooperate to form a single input storage element.

Overlying the part of the coupling loop 27 which is not occupied with the input storage elements is a pick-up conductor 36 of hairpin form earthed at one end to the metal base plate carrying the aluminium sheet 25 and provided at the other with means for connecting it to a gated amplifier 37 responsive to any output signal from the arrangement. A further drive conductor 38, similarly earthed at one end, and provided with means for connecting it to the output of a pulse generator 39 lies over or between the loop 27 and reading conductor 36.

If desired, instead of being directly earthed to the metal base, the conductors 28, 30, 31, 32, and 36 could have been connected to the metal base through a resistor chosen to match their characteristic impedances.

The actual manner in which these components are assembled is shown more clearly in FIGURES 4 and 5, FIGURE 4 being a section of the assembly perpendicular to the easy axis of the film taken through the middle of the loop 27, and FIGURE 5 being a fragmentary exploded view of a single unit of the arrangement shown in FIGURE 3.

Referring now to these two figures, the assembly is mounted on a base plate 40 of aluminum alloy over which it is clamped between two pressure pads of neoprene 41, 42 secured by a clamping plate 43 which can be tightened down towards the base 40 by clamping screws 44.

The actual assembly is carried out face downwards, the parts being placed together in the reverse order to that mentioned with respect to FIGURE 3. The assembly of a single unit as is shown in FIGURE 5 will be described by way of example.

The first neoprene pressure pad 41 is laid on the aluminium base plate 40 and on this is placed the drive conductor 28. One end of this conductor is connected to the base plate 40, and the other end is provided with a small matching resistor 45 to match its impedance to that of the output of the pulse generator 29. The drive conductors 30, 31, 32 are next laid in position at right angles to this, each of these also being earthed to the base 40 at one end, and connected to a matching resistor, respectively 46, 47, 48, at the other for further connection to its respective drive pulse generator 33, 34, 35. The conductor 38 with a matching resistor 49 is similarly assembled in position, and on it is laid the pick-up conductor 36, similarly earthed at one end and provided with a matching resistor 50.

The coupling loop 27 is next laid in position, accurately overlying the parallel parts of the drive conductor 28 and pick-up conductor 36, and on this in turn is inverted the aluminum sheet 25 carrying the magnetic thin film 26. An earthing conductor 51 is laid in contact with the back surface of the aluminium plate 25 and connects it to the base plate 40, and the assembly is completed by placing the further pressure pad 42 in position followed by the clamping plate, the whole assembly being tightened up securely by the clamping screws 44.

With the film and conductors mentioned above, an arrangement constructed in this way was found to operate satisfactorily with current pulses of 2 amperes, with a pulse length of 120 nano-seconds for the writing pulses and a rise time corresponding to the time interval 21 of FIGURE 2, of 10 nano-seconds.

I claim:

1. An arrangement for effecting conditional switching operations and comprising a conducting sheet carrying magnetic thin film having an easy axis of magnetisation and providing at least one group of storage elements including at least one input storage element and one output storage element closely coupled electro-magnetically by a closed conducting loop overlying the storage areas of all the elements of the group and crossing the storage areas perpendicular to the easy axis of the film, means for writing information into at least one storage element, and means for modifying the magnetisation of the storage areas so that by virtue of the electromagnetic coupling due to the closed coupling loop the output storage element may be switched to a state of magnetisation depending on the state of magnetisation of the other storage elements of the group.

2. An arrangement for effecting conditional switching operations according to claim 1 in which the group is provided with writing conductors for writing information into each of the input storage elements and a pick-up conductor for reading information from the output storage element.

3. An arrangement for effecting conditional switching operations according to claim 2 having three input storage elements, whereby, by setting the magnetisations of the areas of one of the input storage elements into one or the other state the arrangement may be used as an AND or an OR gate.

4. An arrangement for effecting conditional switching operations according to claim 2 in which the coupling loop comprises a pair of closely-spaced straight parallel conductors overlying the film-carrying surface perpendicular to the easy axis of the film and joined at each end to form a closed loop, and the means for writing information into the input storage elements and for modifying the magnetisation of the storage areas comprises a first drive conductor of hairpin form having parallel straight limbs overlying the straight portions of the coupling loop over the input storage areas and a set of second drive conductors crossing the coupling loop and the storage areas of the input and the output storage elements parallel to the easy axis of the film, and a pick-up conductor crossing the areas of the output storage element perpendicular to the easy axis of the film for reading out information from the output storage element.

5. An arrangement for effecting conditional switching operations according to claim 1 in which the coupling loop is formed of aluminium anodised on the surface to insulate it from the film and is applied with its anodised surface in contact with the film.

6. An arrangement for effecting conditional switching operations according to claim 2 including a plurality of said groups arranged side by side on the same conducting sheet.

7. An arrangement for effecting conditional switching operations according to claim 4 including a plurality of said groups arranged side by side on the same conducting sheet and in which the said second set of drive conductors is of even-multiple loop form and extends across, for writing cooperation with, each of the said first drive conductors of the individual groups.

8. An arrangement for effecting conditional switching operations according to claim 4 in combination with pulse generators connected to the drive conductors of the group for generating pulses for writing information into the input storage elements, and for modifying the magnetisations of the storage areas of the elements to switch the output storage element conditionally upon the state of the input storage elements, and to read the information stored in the output storage element, the pulse generators being arranged to apply, for modifying the magnetisations in said manner, to the drive conductors crossing the input storage areas parallel to the easy axis of the film a set of pulses which cease, and to the drive conductor crossing the output storage areas parallel to the easy axis of the film a pulse which commences, during a common time interval not substantially greater than the time constant of decay of current in the coupling loop.

References Cited in the file of this patent

UNITED STATES PATENTS 2,997,695 Conger et al. ............ Aug. 22, 1961